United States Patent
Udall

(10) Patent No.: US 7,654,075 B2
(45) Date of Patent: Feb. 2, 2010

(54) FAN STATIC STRUCTURE

(75) Inventor: Kenneth F. Udall, Kirk Hallam (GB)

(73) Assignee: Rolls-Royce PLC, London (GB)

( * ) Notice: Subject to any disclaimer, the term of this patent is extended or adjusted under 35 U.S.C. 154(b) by 500 days.

(21) Appl. No.: 11/520,671

(22) Filed: Sep. 14, 2006

(65) Prior Publication Data
US 2007/0084218 A1     Apr. 19, 2007

(30) Foreign Application Priority Data
Oct. 14, 2005    (GB) ................... 0520850.9

(51) Int. Cl.
*F02K 3/04*     (2006.01)
(52) U.S. Cl. ....................... 60/226.1; 60/796
(58) Field of Classification Search ........... 60/226.1, 60/262, 796, 797; 415/211.2
See application file for complete search history.

(56) References Cited
U.S. PATENT DOCUMENTS
3,398,535 A     8/1968   Campbell et al.
3,536,414 A *   10/1970  Smith ...................... 415/208.5
2005/0109013 A1* 5/2005  Eleftheriou et al. ........ 60/226.1

FOREIGN PATENT DOCUMENTS
| EP | 1 333 181 A1 | 8/2003 |
| GB | 1195027 | 6/1970 |
| GB | 1259963 | 1/1972 |
| GB | 2 238 082 A | 5/1991 |

* cited by examiner

*Primary Examiner*—Louis J Casaregola
(74) *Attorney, Agent, or Firm*—Oliff & Berridge, PLC

(57) ABSTRACT

A static structure is provided such as that used as an engine structure 30 within a gas turbine engine. A structure 30 comprises a hub or core 33 with a concentric ring or casing 32. The hub 33 and casing 32 are secured together through spoke or vane elements 31 which are sloped axially and tangentially relative to a principal axis X-X. In such circumstances any roll torque reaction caused by differentially rotating hub and ring motions is retained by the tangential inclination of the spokes or vanes whilst axial sloping of these spokes or vanes 31 and axially sloping of the struts 34 creates bracing in the direction of the principal axis X-X. In such circumstances essentially robust triangles are formed radially and longitudinally respectively each comprising spokes or vanes 31 and struts 34 secured at axially spaced locations on the hub or core 33.

14 Claims, 4 Drawing Sheets

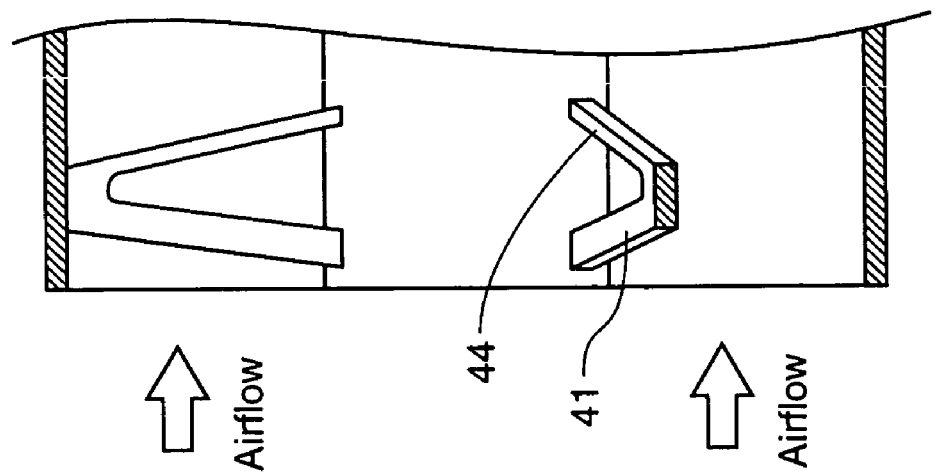

FAN STATIC STRUCTURE

The present invention relates to static structures and more particularly to gas turbine engine static structures utilised for aircraft propulsion.

Operation of gas turbine engines in order to provide thrust is well known. Generally, a number of compressor stages act to suck and compress air for mixture with fuel where it is burnt in a combustor and then blown through turbines which drive the compressors in the cycle as well as provide thrust. Each of the compressor and turbine stages are mounted on shafts with appropriate gear boxes and other mechanisms to achieve operational performance. It will be understood that there are a number of reaction forces operating within the engine in terms of rotation of the compressor blades and turbine blades and these reaction forces are resolved in the mounting for the engine to an aircraft wing or fuselage. It will also be understood that for improved performance within the engine a number of guide vanes will be provided and generally the engine will be angled such that there are side and uploads presented by the air flows into the intake for the engine. All these forces as well as the mass of the engine must be secured to the wing or fuselage by an appropriate mounting for balance and strength.

FIG. 1 illustrates schematically a typical gas turbine engine structure 1 in which compressors 2 are arranged on common shafts 3 with turbines 4. These compressors 2, shafts 3 and turbines 4 are located within a core casing 5 and the engine is secured through appropriate mountings to a pylon 6, itself secured to an aircraft wing 7. It will be understood that the intake reaction load 8 as an airflow 9 is drawn into the engine coupled with thrust 10 to produce pitch moments 11 in the same direction and acting in a vertical plane. It will be noted it is integral to the engine structure 1 that these moments are transferred through a fan casing 12 to an engine core 5 by opposing vertical loads on outlet guide vanes (OGVs) 13, and A frames 14. The OGVs act between the core and the fan case in order to control the flow through the engine. The outlet guide vanes and A frames are located along the length of the rear fan case 15. Intake side loads are illustrated by broken line 16. Externally of the engine's structure 1 these reaction moments are transferred to the pylon 6 through front 17, 18 and rear 19, 20 mounting reactions separated by the engine mounting span on the pylon 6. It will be understood that the couples from the intake loads 8, 16 and the reaction forces 17, 18, 19, 20 tend to bend the core of the engine structure 1. It will be understood that the reactions 18, 20 to intake side loads 16 induce a roll torque about the central axis X-X. This is transferred to the core of the engine structure predominantly by an A frame tension/compression reaction and then transferred along the core to a rear mounting through the mounting torque reaction 21 and then into the pylon 6.

It will be understood that a thrust reverser is placed within an engine in order to avoid such effects as engine thrust reverser efflux impingement onto the deployed leading edge slats of the wing 7. It will be understood that in combination with the engine pylon 6 and wing 7 gully as well as engine ground clearance considerations the thrust reverser position affects the placement of the engine on the aircraft. Generally for a mixed jets nacelle the length of the rear fan case is no handicap as the common nozzle is aft of the engine rear bearing housing 22, but as gas turbine engine fan sizes increase for noise and performance objective reasons, the structure tends to favour a separation of flow jets at exit from the engine. These jets are mounted higher from the ground with the cold nozzle level then consistent with or forward of the wing leading edge.

It will be understood that the rear fan case is between the fan and the thrust reverser, which in turn is forward of the cold nozzle. Deletion of the rear fan case allows the engine to be placed closer to the wing. This shortens the nacelle and the pylon, reducing the wing attachment loads. However, alternative engine structures must then be provided in order that the reaction loads and moments can be appropriately reconciled within the structure for operational purposes.

In accordance with the present invention there is provided a static structure for a gas turbine engine, the structure comprises a ring and a hub aligned along a principal axis X-X with a plurality of vane elements and strut members between the ring and the hub, the static structure characterised in that at least some of the vane elements are angled to be sloped with an axial lean to the principal axis and to have a tangential inclination between the ring and the hub, the ring and the hub subject to differential rotation in use causing roll torque restrained by the tangential inclination of the vane elements with the axial lean of the vane elements allowing for a differential axial movement to be restrained in use at least in part by the strut members.

Typically, there are at least three strut members. Generally for three struts, these strut members are evenly tangentially spaced at 120° apart about the principal axis.

Possibly, the strut members are secured directly to the hub. Generally, one strut member is arranged to be aligned with the top dead centre of the structure. Alternatively and possibly additionally, one strut is aligned with the bottom dead centre of the structure.

Possibly, the struts are orientated in axial planes. Alternatively, the struts are orientated in non-axial planes. Particularly, an inner strut member attachment lies directly behind an inner vane element attachment.

Possibly, an end of the strut member is integrated with an outer end of one vane spoke element. Furthermore, a web junction of the end of the strut member and the outer end of the vane is extended between the vane element and the strut.

An embodiment of the present invention will now be described by way of example and with reference to the accompanying drawings in which:

FIG. 4A is a schematic view looking in the direction of air flow showing the positioning of the struts.

FIG. 4B is a perspective view from the side of the engine showing the sloping and positioning of the struts with respect to their corresponding vane elements.

Problems arise with roll torque reaction between a fan casing 32 (including ring 36) and hub 33 static structures. The present static structure is described relative to a fan casing 32 and hub core 33 of a gas turbine engine but could be utilised in other mechanisms.

As indicated above if the rear fan case length as part of the fan to nozzle distance can be reduced or removed it is possible for the engine to be placed closer to the wing so shortening the nacelle and pylon by which the engine is secured to the wing. In such circumstances by arranging that the engine is closer to the wing leading edge it will be understood that the levered pylon to wing attachment load is reduced by the reduced aerodynamic and inertial load offset from the wing.

Figure 1:
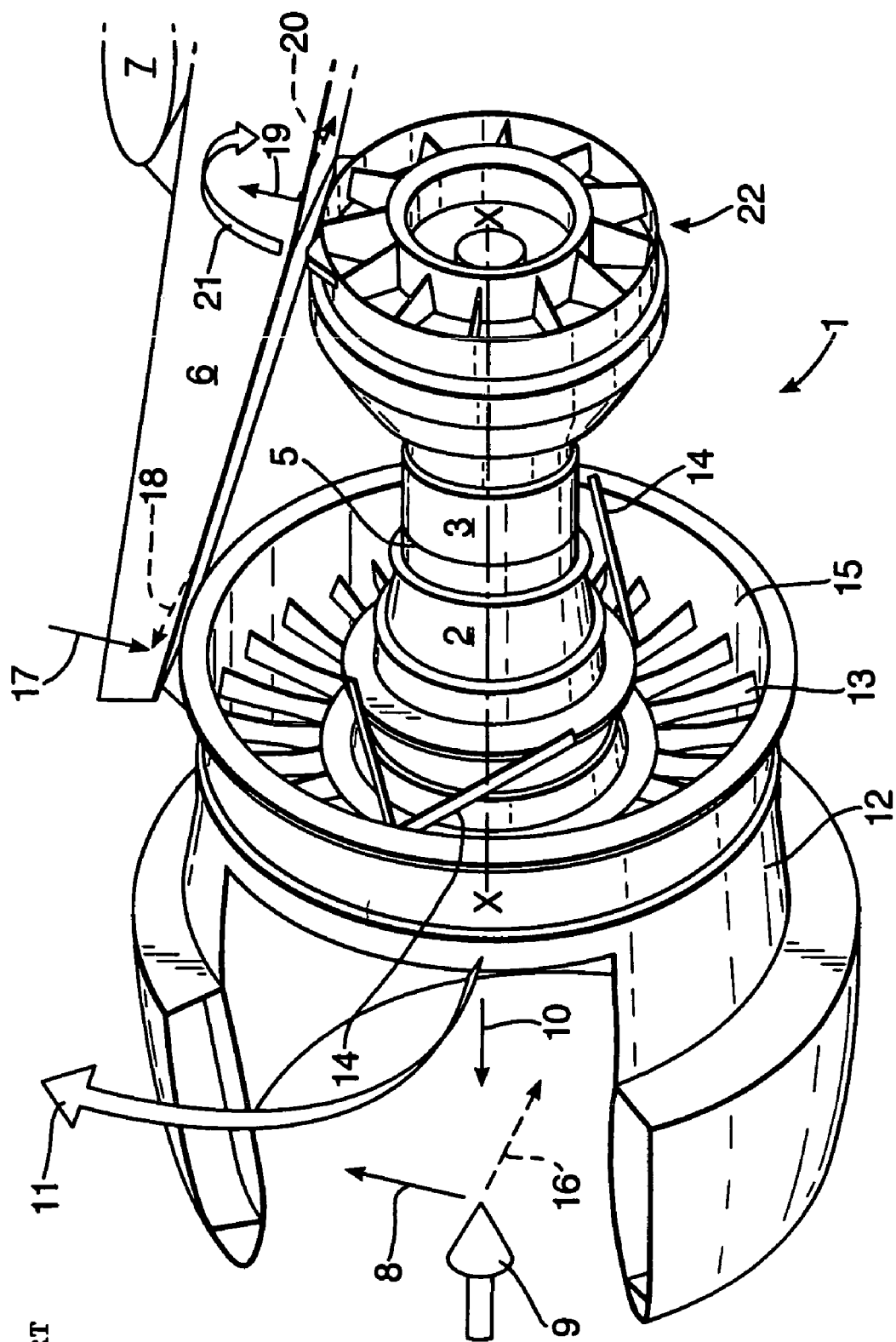
FIG. 1 is a schematic view looking forward from the rear of a conventional gas turbine engine showing a support structure between a core engine and a fan casing.
Figure 2:
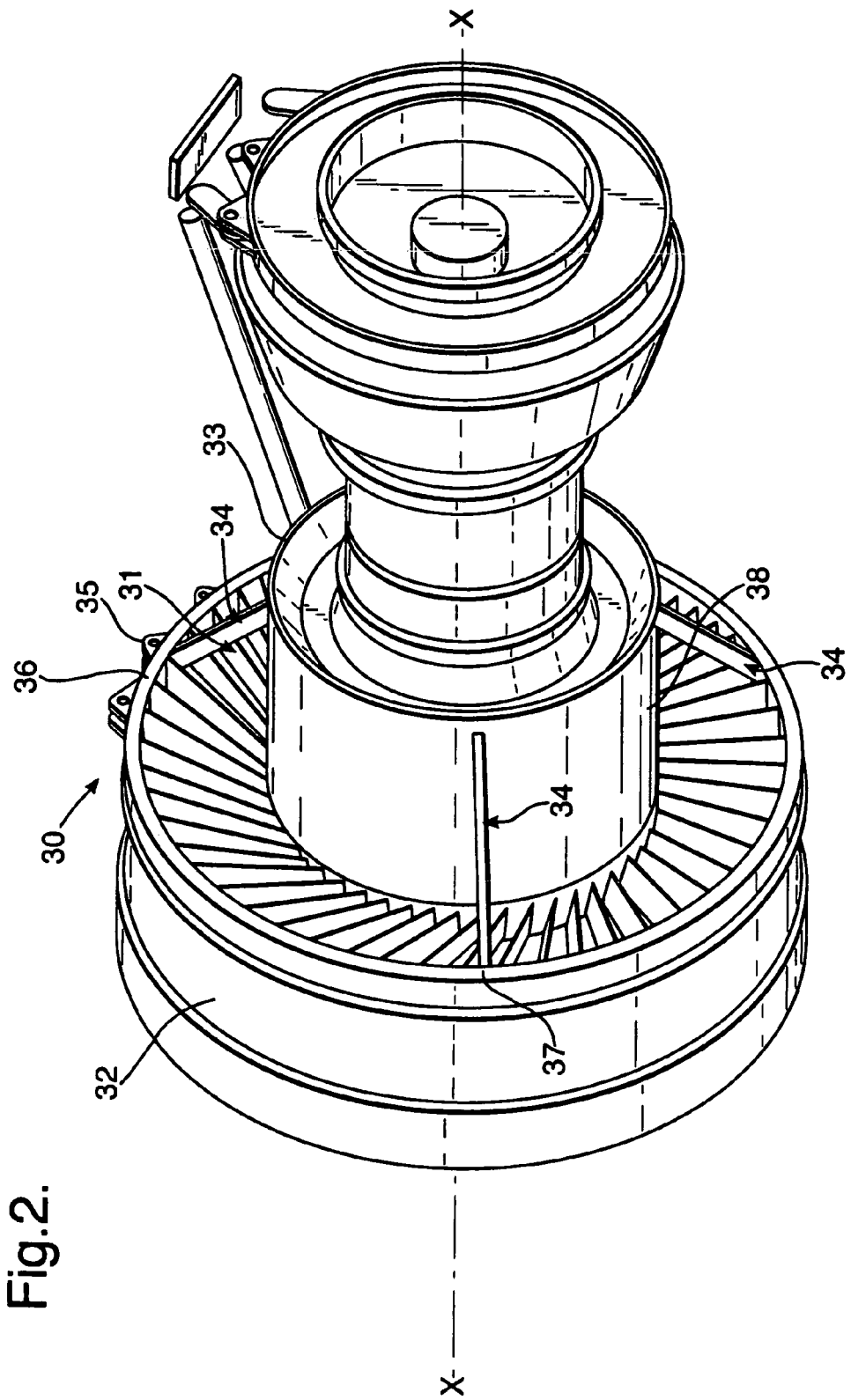
FIG. 2 is a schematic view looking forward from the rear of a gas turbine engine showing a support structure between a core engine and a fan casing in accordance with the present invention.

Referring to FIG. 2 as can be seen an engine structure includes outlet guide vanes 31 secured between a fan casing 32 and a core platform 33 which may be a front bearing frame 38 which houses bearings for the shafts of the engine. Also extending between the casing 32 and the core 33 are struts or props 34 which are radially and axially orientated in order to brace the outlet guide vanes.

Figure 3:
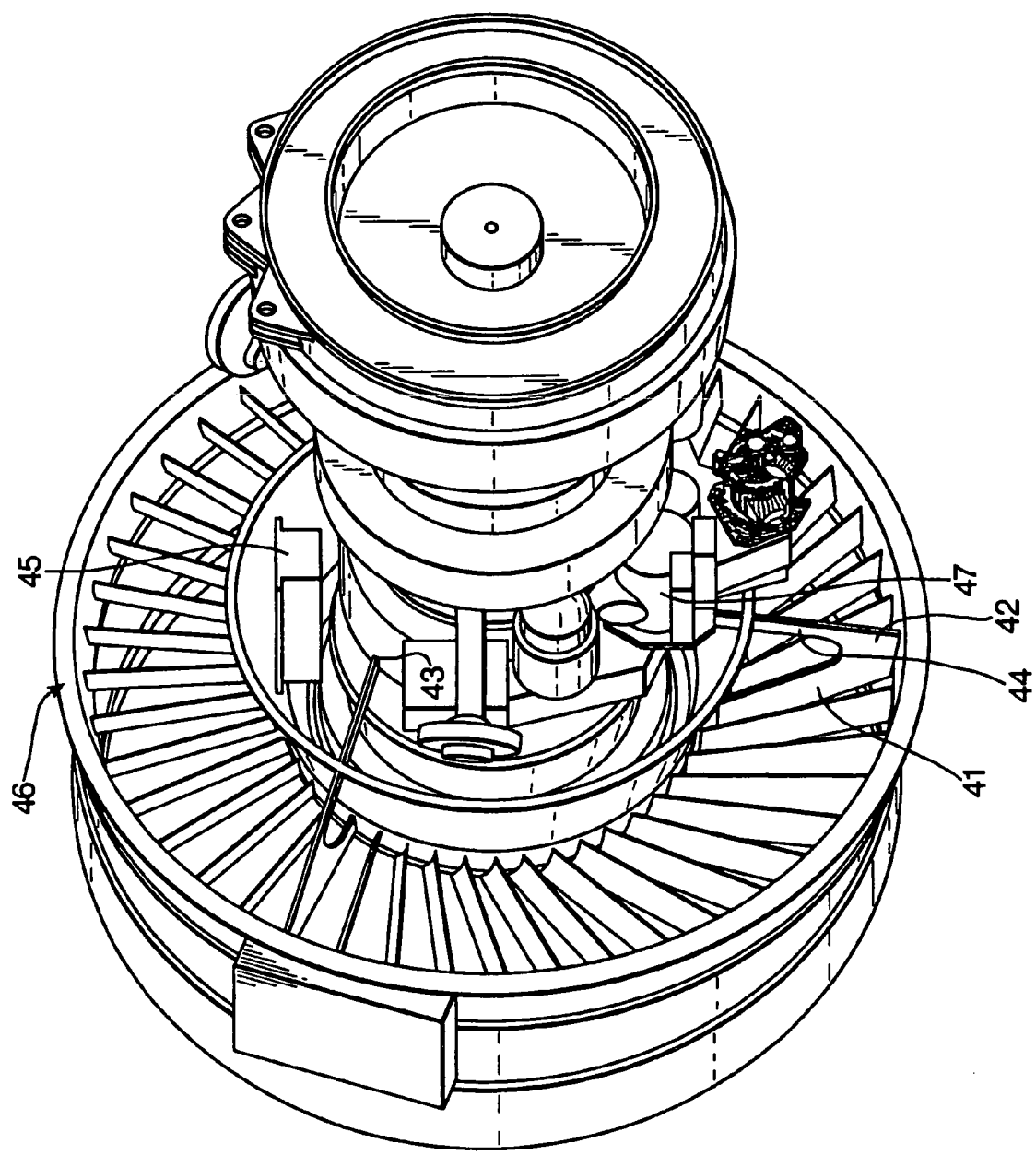
FIG. 3 is a schematic view looking forward from the rear of a gas turbine engine showing another support structure between a core engine and a fan casing in accordance with the present invention.

The outlet guide vanes (OGVs) are sloped in the range 0 to 30 degrees axially and tangentially in the range 0 to 40 degrees but typically 20° of hub rotation, that is to say the outlet guide vanes 31 are angled relative to a principal axis X-X through the engine structure as well as tangentially, that it to say each vane is sloped relative to the perpendicular between the casing 32 and the core 33. Structurally, both clockwise and anti-clockwise rotation is possible. Normally the tangential slope is in the opposite direction to that depicted in FIG. 2 as depicted in FIG. 3 OGVs 41 to oppose clockwise rotation of fan blade exit air flow within a gas turbine engine incorporating the present structure. Such tangential sloping of the outlet guide vanes will provide improved performance with respect to noise and buckling in use. As a further development the struts may be rotated at the core attachment 43 to lie behind the OGV, and in line with the OGV trailing edge. The OGV 41 and strut 44 may then be joined at the outer ends by a web 42, at the ring 46.

Within the engine structure 30 struts 34 are arranged as shown with a 120° spacing between each strut 34. Generally there are at least three struts 34 in order to achieve the necessary bracing and stiffening within the engine structure. For a hybrid mounting as shown in FIG. 2 or a fan case mounting, a strut 34 orientation as shown is suitable. For a core mounting as shown in FIG. 3 the struts may be rotated through 60° or as necessary to provide space for a core mount 45 placed at top dead centre. In such circumstances it will be appreciated that a strut 44 will then be presented at the bottom dead centre of the engine and so may be integrated with the gear box drive housing 47 and other structural features.

It will be noted in FIG. 2 that one of the struts 34 is associated with a catcher flange 35 on a ring 36. It will be understood that this will provide improved support for the catcher flange and hence in the event of a primary mount link failure the stiffening effect provided by the present invention will provide a better connection to the pylon upon which the engine is secured.

The present engine structure 30 provides six degrees of freedom connection. These degrees of freedom relate to vertical, side, axial, roll, pitch and yaw between the fan casing 32 and the core 33 of the structure 30. The struts 34 connect the hard point at the outlet guide vane and outer ring structure with the core, in this case the core hard points may be on the frame that houses the low, intermediate and high pressure rotor location bearings for the engine.

In such circumstances, it will be appreciated that the outlet guide vanes 31, struts 34 and casing 33 form three relatively stiff triangular fan case to core frames each comprising OGVs local to a strut, the strut itself, and the region of casing connecting the OGV and strut inner ends. In such circumstances the relatively stiff and robust frames connect the fan case to the core axially, vertically, horizontally, and in pitch and yaw. Roll torque created due to differential rotation of the fan case 32 and the core 33 in an operational engine is restrained by compression/tension in the tangentially leaning outlet guide vanes 31. As indicated the outlet guide vanes have a tangential lean so that a hoop reaction conflict is created between the concentric mounting ring 36 and core 33. This hoop tension and compression is alleviated by the axial slope of the outlet guide vanes which lean to allow differential axial movement that is to say forwards and rearwards along the principal axis X-X. This axial movement is itself restrained by the strut 34, OGV 31 and core 33 triangular frames mentioned above.

By the present engine structure it will be understood that it is possible to reduce and minimise the structural length by removing the need for a rear fan case extension sufficient to allow for stabilisation of the structure for pitch and yaw transfer from the fan case to the core.

As indicated above as gas turbine engine fan size increases and outlet guide vanes are sloped axially, the rear fan case length to diameter ratio reduces. In such circumstances within a classical three shaft (low, intermediate and high speed spools) engine, the approach of transferring pitch or yaw couples from fan case to core by a pair of vertical (or side) shear loads in the outlet guide vanes and A frames spaced horizontally by the rear fan case length becomes less structurally efficient and provides a decrease in mechanical advantage as fan size increases.

By the present engine structure pitch or yaw couples are accommodated by opposed pairs of axial loads in the frame formed between the slopes of the outlet guide vanes 31 in their mounting ring and the struts 34 respectively mounted at displaced positions on the core 33. In short the axially sloped strut 34 braces the outer end of the outlet guide vanes. The other end of the strut 34 is mounted upon an element of the core 33 to provide a robust mounting and bracing for the outlet guide vane mounting ring 36. In such circumstances the axial spacing provided between the axially sloped outlet guide vanes 31 at its attachment to the core and the axially sloped strut 34 at its attachment to the core is significantly greater than previous arrangements giving significant mechanical advantage and strength enhancements.

It will be understood in the fluid flows of a gas turbine engine aero dynamic effects are important. In such circumstances the junction 37 of the strut 34 and the outlet guide vanes 31 at its outer end towards the ring 36 will generally be integrated and appropriately aerodynamically shaped to achieve best effect. This is shown in FIG. 3 at the conjunction 42 of strut 44 and vane 41 as a web. In such circumstances the mounting provides a broader junction width with the ring 36 again enhancing stability and strength. It will also be understood as the junction 42 may be extended in a web down the outlet guide vane 41 and struts 44. This will further stiffen the structure but in such circumstances it will be understood that there will be a general increase in wetted area, that is to say area exposed to the frictional drag of fan air flow. To offset this, there may be a possible reduction in profile loss.

It will be understood that in order to minimise distortions from axial loading of the triangular frames, balance is generally required. In such circumstances where there are three struts 34 it is appropriate to arrange that the outlet guide vane numbers are divisible by three, that is to say to ensure that there are the same number of outlet guide vanes 31 in each sector between the triangular frames defined between the strut members.

For situations where the need to provide space for an engine core mount means that the three struts are placed in a "Y" formation (with one strut 44 at BDC) as shown in FIG. 3 it is convenient to locate their inner ends onto a 9 spoke core intermediate case. For a hybrid mount, with 1 strut at TDC on the fan case, the struts could be "clocked" to locate to a 9 spoke intermediate case, or could each bridge to 2 spokes, for balance. Typically, the minimum number of struts is three but there may be advantages with regard to increasing the number of struts to four or more to improve the number of axial reinforcement triangles created by the axially and tangentially sloped outlet guide vanes and respective struts.

By using more struts it will be understood that loading would be more evenly distributed and that pitch and yaw load will be transferred more effectively whilst top and bottom struts could be aero dynamically hidden in top and bottom bifurcations locations within the engine structure.

It will be appreciated that the present engine structure could also be utilised in other situations where there are differentially rotating hub and ring structures creating a roll torque conflict. In such circumstances the axial triangles will be again be formed by a spoke arrangement comprising elements which replace the vane elements described above but similarly spokes are sloped tangentially and axially between the hub and the outer ring in order to create the resistance to the roll torque from restraint by the tangential inclination of the spoke elements whilst the axial slope of the spoke elements forms a mounting triangle with strut elements which extend to axially spaced locations on the hub to brace the mounting ring creating an overall strong structure which is well connected between the rim and the hub.

Whilst endeavoring in the foregoing specification to draw attention to those features of the invention believed to be of particular importance it should be understood that the Applicant claims protection in respect of any patentable feature or combination of features hereinbefore referred to and/or shown in the, drawings whether or not particular emphasis has been placed thereon.

I claim:

1. A static structure for a gas turbine engine, the structure comprising:
    a ring and a hub aligned along a principal axis X-X, the hub being disposed radially within the ring;
    a plurality of vane elements and strut members between the ring and the hub,
    wherein at least some of the vane elements are angled in a first direction so as to be sloped with respect to the principal axis and also in a second direction so as to have a tangential inclination between the ring and the hub,
    the ring and the hub being subject to differential rotation in use causing roll torque and the tangential inclination of the vane elements being arranged to restrain said roll torque, and
    at least some of the strut members being sloped with respect to the principle axis so as to oppose and at least in part brace a differential axial movement associated with the axial lean of the vane elements in use.

2. A structure as claimed in claim 1 wherein there are at least three strut members.

3. A structure as claimed in claim 1 wherein the strut members are evenly radially spaced at 120° apart about the principal axis.

4. A structure as claimed in claim 1, wherein the strut members are secured directly to the hub.

5. A structure as claimed in claim 1 wherein one strut member is arranged to be aligned with the top dead centre of the engine structure.

6. A structure as claimed in claim 1 wherein one strut member is aligned with the bottom dead centre of the structure.

7. A structure as claimed in claim 1 wherein the struts are orientated in axial planes.

8. A structure as claimed in claim 1 wherein the struts are orientated in non-axial planes.

9. A structure as claimed in claim 8 wherein the struts are oriented to have a tangential inclination such that the struts have an inner strut attachment to the hub, the inner strut attachment lying directly behind a corresponding inner vane member attachment to the hub when viewed in a principal axis direction.

10. A structure as claimed in claim 1 wherein an end of each strut member is integrated with an outer end of a respective vane element.

11. A structure as claimed in claim 10 wherein a web junction at the end of the strut member and an outer end of one vane element is extended between the vane element and the strut member.

12. A structure as claimed in claim 1 wherein the ring is part of a fan casing and the hub is part of a core of a gas turbine engine.

13. A structure as claimed in claim 1 wherein the vane elements are outlet guide vanes of a gas turbine engine.

14. A gas turbine engine incorporating a static structure as claimed in claim 1.

* * * * *